United States Patent
Krob (12)

(10) Patent No.: US 12,545,180 B2
(45) Date of Patent: Feb. 10, 2026

(54) TAILGATE POSITION INDICATOR

(71) Applicant: Monti Krob, Mount Vernon, IA (US)

(72) Inventor: Monti Krob, Mount Vernon, IA (US)

( * ) Notice: Subject to any disclaimer, the term of this patent is extended or adjusted under 35 U.S.C. 154(b) by 593 days.

(21) Appl. No.: 18/052,732

(22) Filed: Nov. 4, 2022

(65) Prior Publication Data

US 2023/0234499 A1 Jul. 27, 2023

Related U.S. Application Data

(60) Provisional application No. 63/301,581, filed on Jan. 21, 2022.

(51) Int. Cl.
*B60Q 9/00* (2006.01)

(52) U.S. Cl.
CPC ...................................... *B60Q 9/00* (2013.01)

(58) Field of Classification Search
CPC .... B60Q 9/00; B60Q 1/2661; B62D 33/0273; B62D 33/037; B60J 7/198; B60R 25/1001
USPC ....... 116/28 R, 56, 12, 35 R, 45, 46, 51, 52; 280/432; 33/264
See application file for complete search history.

(56) References Cited

U.S. PATENT DOCUMENTS

| | | | | |
|---|---|---|---|---|
| 3,924,558 | A * | 12/1975 | Di Grazia | B60Q 1/305 116/303 |
| 6,651,581 | B2 * | 11/2003 | Gauthier | B60Q 1/484 116/28 R |
| 7,000,563 | B2 * | 2/2006 | Hensel | B60Q 1/307 116/35 R |
| 7,389,739 | B1 * | 6/2008 | Smith | B60J 5/108 116/28 R |
| 2003/0196583 | A1 * | 10/2003 | Hensel | B60Q 1/484 116/28 R |
| 2007/0181052 | A1 * | 8/2007 | Deichman | B60Q 7/02 116/30 |

* cited by examiner

*Primary Examiner* — Paul M. West
*Assistant Examiner* — Evan Mancini
(74) *Attorney, Agent, or Firm* — McKee, Voorhees & Sease, PLC

(57) ABSTRACT

A tailgate position indicator allows a person in the cab of a pickup truck to observe the open and closed positions of a tailgate of the truck when a bed cover on the truck is rolled out or closed. The indicator includes a spring biased flag mounted to the bed cover for movement between a raised position visible from the cab to indicate that the tailgate is open and a lowered position substantially out of view from the cab to indicate when the tailgate is closed. The flag is moved to the lower position by the upper edge of the tailgate when the tailgate is closed. The flag resides over the top edge of the tailgate when the tailgate is closed and extends above the bed cover when the tailgate is open. The flag automatically moves to the raised position when the tailgate is opened.

20 Claims, 6 Drawing Sheets

TAILGATE POSITION INDICATOR

CROSS REFERENCE TO RELATED APPLICATIONS

This application claims priority under 35 U.S.C. § 119 to provisional patent application U.S. Ser. No. 63/301,581 filed Jan. 21, 2022. The provisional patent application is herein incorporated by reference in its entirety, including without limitation, the specification, claims, and abstract, as well as any figures, tables, appendices, or drawings thereof.

TECHNICAL FIELD

The invention is directed toward the automobile industry, and particularly, toward a flag to provide a visual indication of whether a pickup truck tailgate is raised or lowered.

BACKGROUND

Pickup truck tailgates are movable between a raised, closed position and a lowered, open position which provides access to the bed of the truck. Many truck owners have a bed cover which can be moved between a closed position overlying the bed and an open position which exposes the bed. The tailgate can be opened and closed with the bed cover either open or closed. When the bed cover is closed, the position of the tailgate is difficult to see from inside the truck cab. A truck driver may inadvertently leave the tailgate open and drive away, thus creating a risk that objects may fall from the open rear end of the bed. A simple solution is needed that allows the truck driver to quickly confirm that the tailgate is closed when the bed cover is closed before the truck moves.

Accordingly, a primary objective of the present invention is the provision of a flag which provides a visual indication to the truck driver of the raised or lowered position of the tailgate when the bed cover is closed.

Another objective of the present invention is the provision of the tailgate position indicator which automatically pops up to be seen when the tailgate is open and the bed cover is closed.

Still another objective of the present invention is the provision of a tailgate position indicator which mounts to a rear edge of the bed cover of a pickup truck.

A further objective of the present invention is the provision of a tailgate position indicator which automatically raises when the tailgate is open and lowers when the tailgate is closed.

A further objective of the present invention is the provision of a method of indicating the open and closed positions in a pickup truck tailgate by extending a flag upwardly above a bed cover of the truck when the tailgate is open so that a person in the cab of the truck can see the flag, and extending the flag below the bed cover when the tailgate is closed so that the person in the cab cannot see the flag.

Another objective of the present invention is the provision of a tailgate position indicator that allows a person in the cab of the truck to observe the open and closed positions of the tailgate, without leaving the cab.

Yet another objective of the present invention is the provision of a tailgate position indicator which operates mechanically, without the use of sensors, switches, or other electronic components.

These and/or other objects, features, advantages, aspects, and/or embodiments will become apparent to those skilled in the art after reviewing the following brief and detailed descriptions of the drawings.

SUMMARY

The tailgate position indicator for a pickup truck having a tailgate and a roll up bed cover includes a hinge having a first leaf mounted to a lower rear edge of the bed cover and a second leaf movable between a downwardly extending open position and a forwardly extending closed position. The second leaf is spring biased toward the open position. The flag is mounted on the second leaf so as to extend upwardly beyond the bed cover when the second leaf is in the open position to provide a visual indication to a person in the truck cab that the tailgate is open. The second leaf is moved to the closed position by the tailgate when the tailgate is closed, such that the flag is lowered below the bed cover to provide a visual indication to a person in the truck cab that the tailgate is closed. The flag is pivotally connected to the second leaf and can be rotated 90 degrees to roll with the bed cover when the bed cover is rolled up from the closed position to the open position, such that the indicator flag lies flat against the bed cover when the bed cover is opened.

The tailgate position indicator is wholly mechanical, and is free from any electrical components.

BRIEF DESCRIPTION OF THE DRAWINGS

FIG. 2 shows the indicator with the flag raised, to indicate that the tailgate is opened.

FIG. 3 shows the indicator with the flag lowered, indicating that the tailgate is closed.

FIG. 4 is a rear view of the indicator, with the flag raised.

FIG. 5 is a side view of the indicator with the flag raised.

FIG. 6 is a view showing the indicator with the flag raised and the tailgate slightly opened.

FIG. 7 is a view of the indicator with the tailgate fully closed and the flag lowered.

DETAILED DESCRIPTION

Figure 1A:
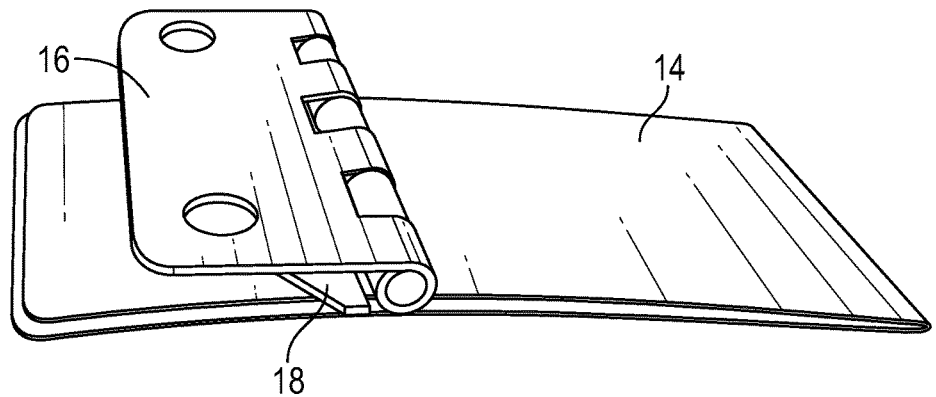
FIG. 1A is a perspective view showing the tailgate position indicator of the present invention, with the hinge in a closed position.
Figure 1B:
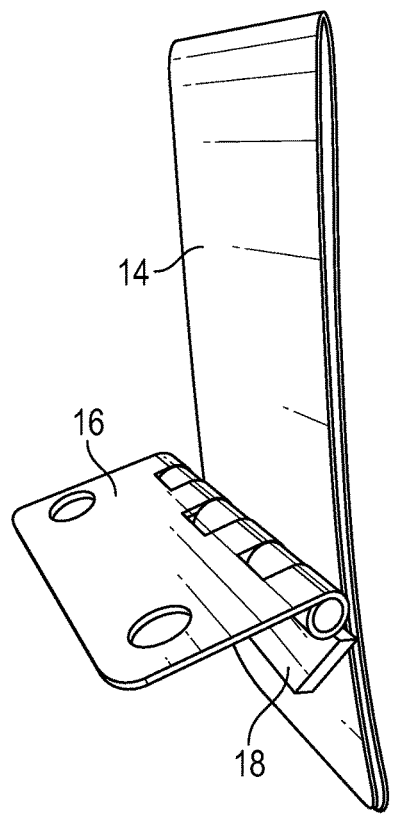
FIG. 1B is a perspective view of the indicator showing the hinge in a 90° open position.
Figure 1C:
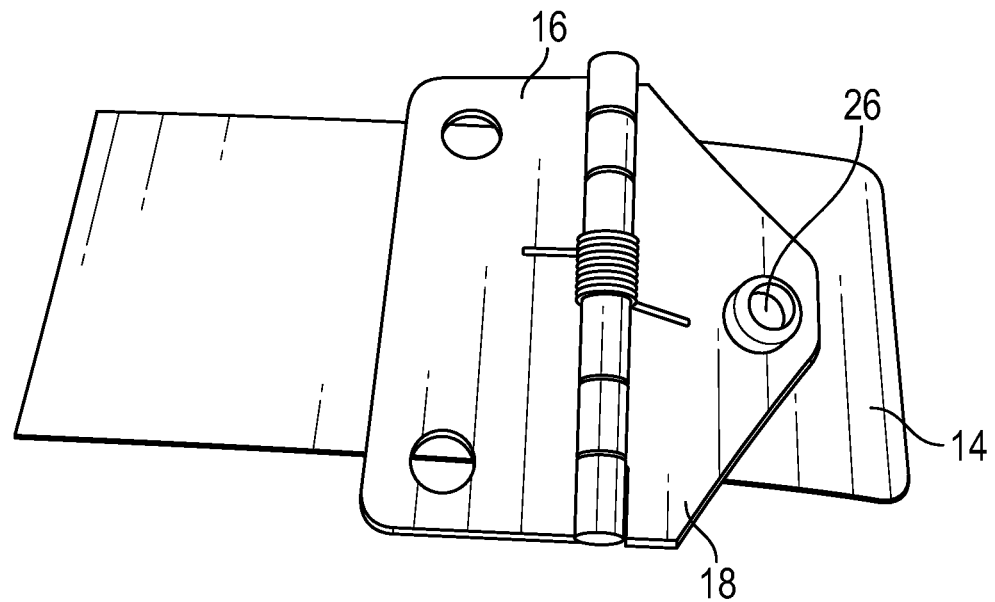
FIG. 1C shows the hinge in a 180° opened position, before mounting.
Figure 1C:
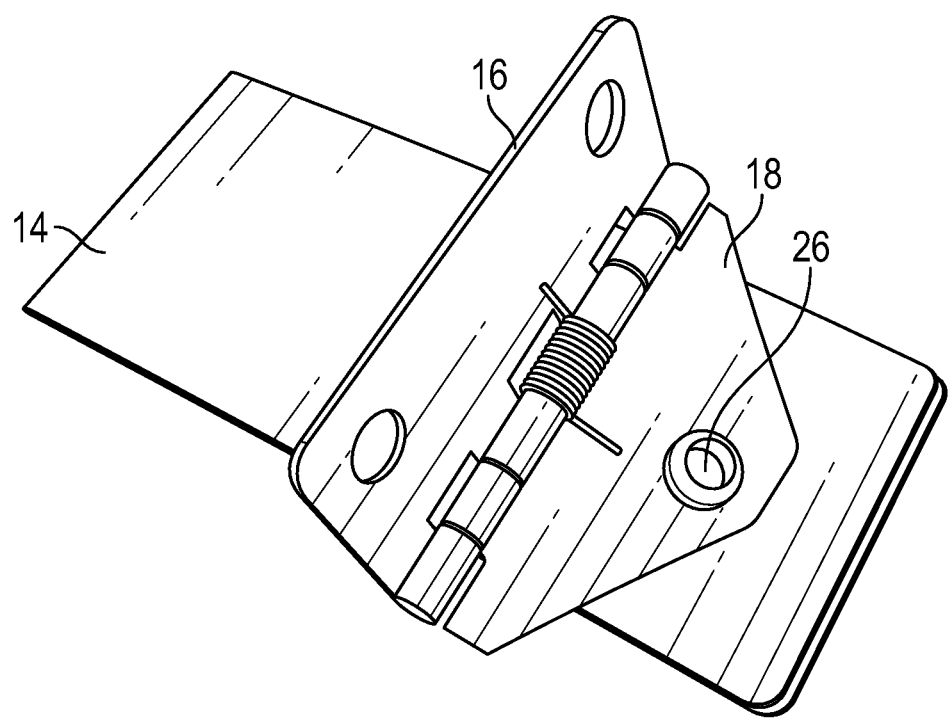

The tailgate position indicator of the present invention is generally designated by the reference numeral 10 in the drawings. The indicator 10 includes a hinge 12 and a flag 14 mounted on the hinge 12. The hinge 12 includes a first leaf 16 and a second leaf 18. A spring 20 on the hinge 12 biases the hinge to an open position wherein the second leaf 18 extends approximately 90° from the first leaf 16.

Figure 2:
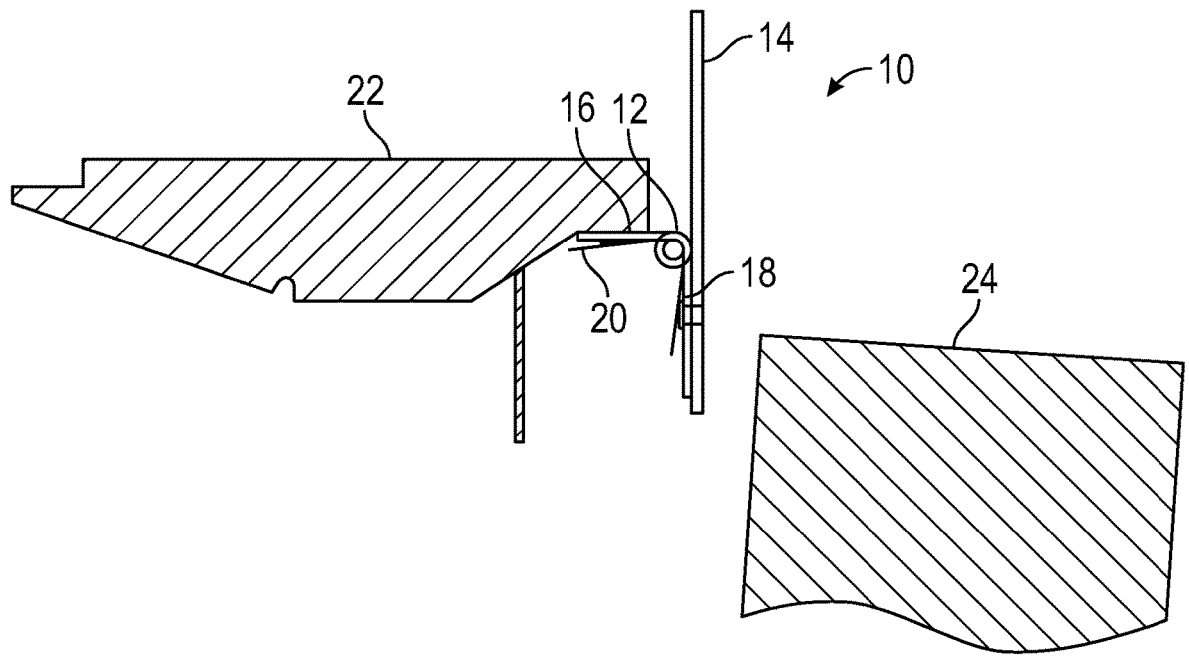
FIGS. 2-7 show the tailgate position indicator in use as mounted on the truck bed cover.

As shown in FIG. 2, when the tailgate is open (or not fully closed), the spring 20 biases the hinge 12 to an open position wherein the flag 14 extends substantially vertically and upwardly beyond the top of the bed cover 22. In this open position, the flag 14 can be seen by a driver or other person in the cab of the pickup truck.

Figure 3:
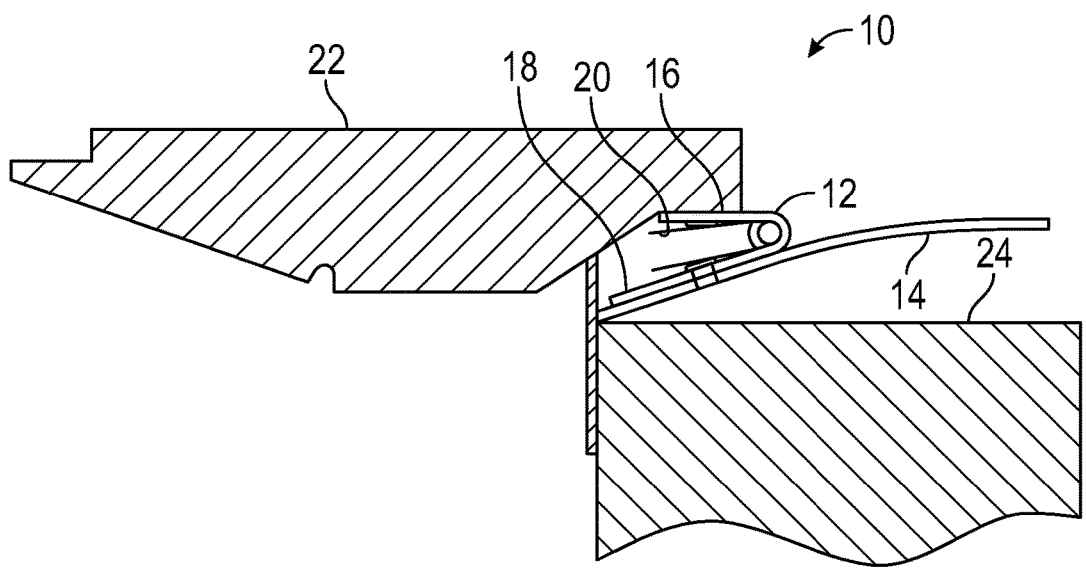
Figure 4:
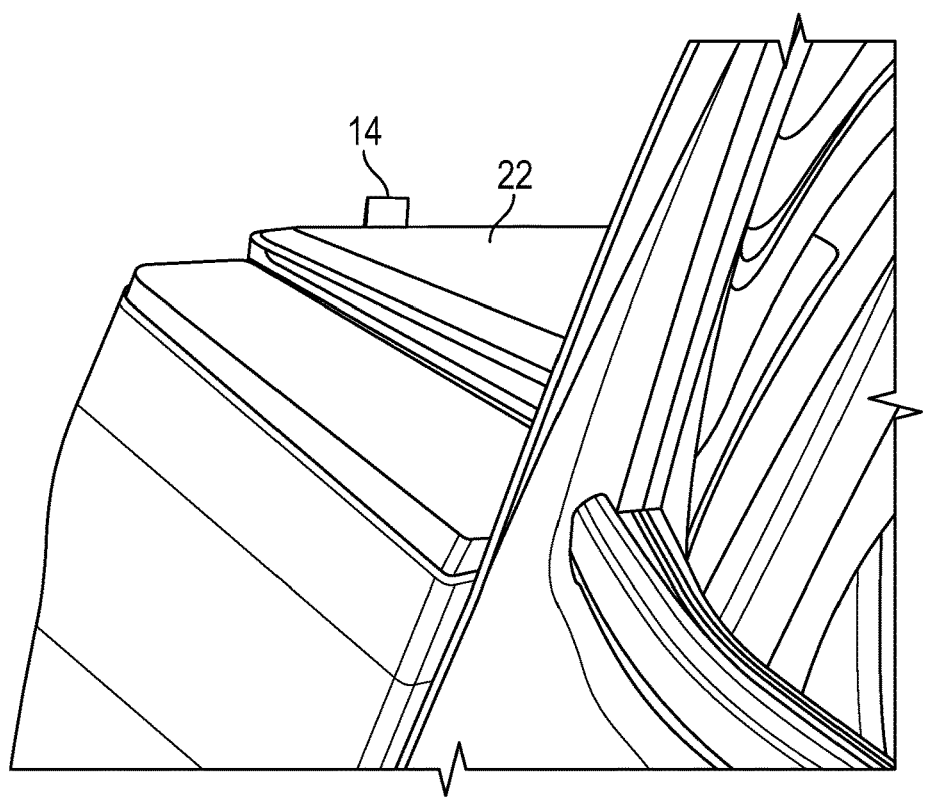
Figure 5:
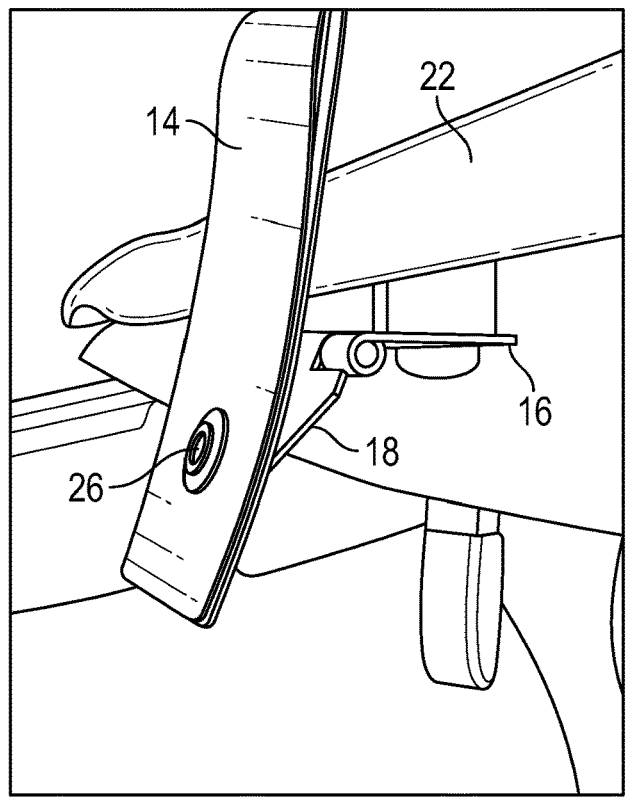
Figure 6:
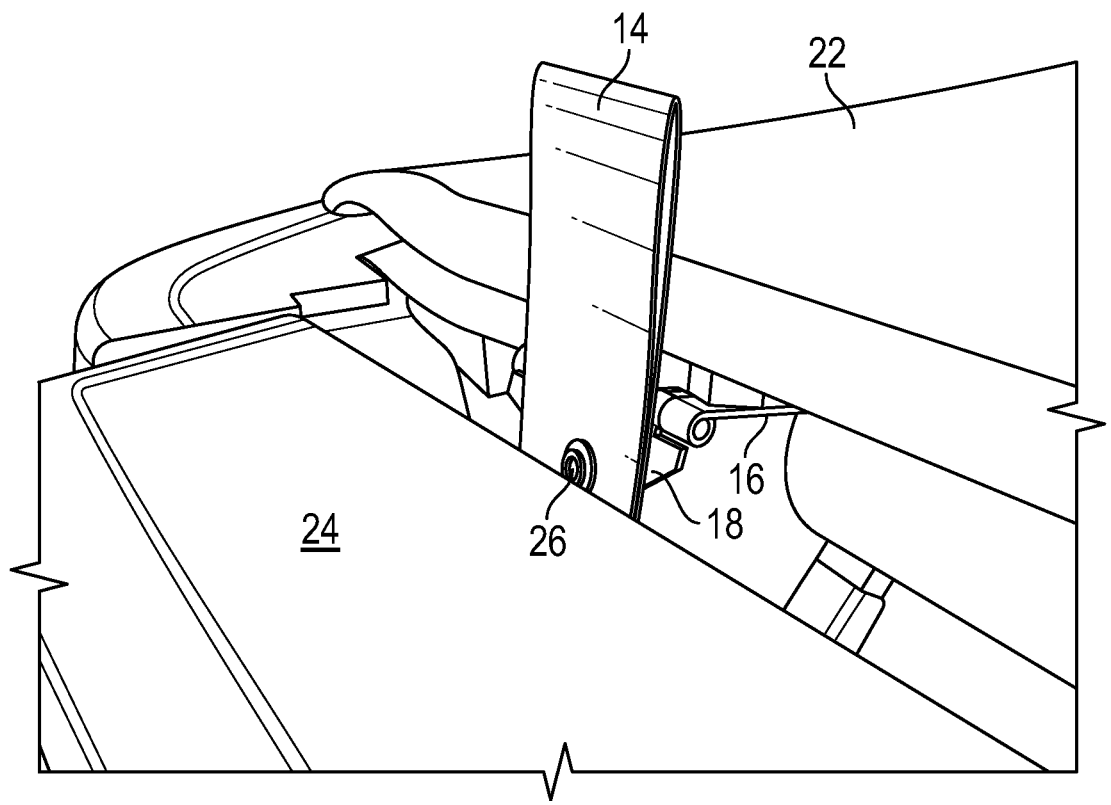
Figure 7:
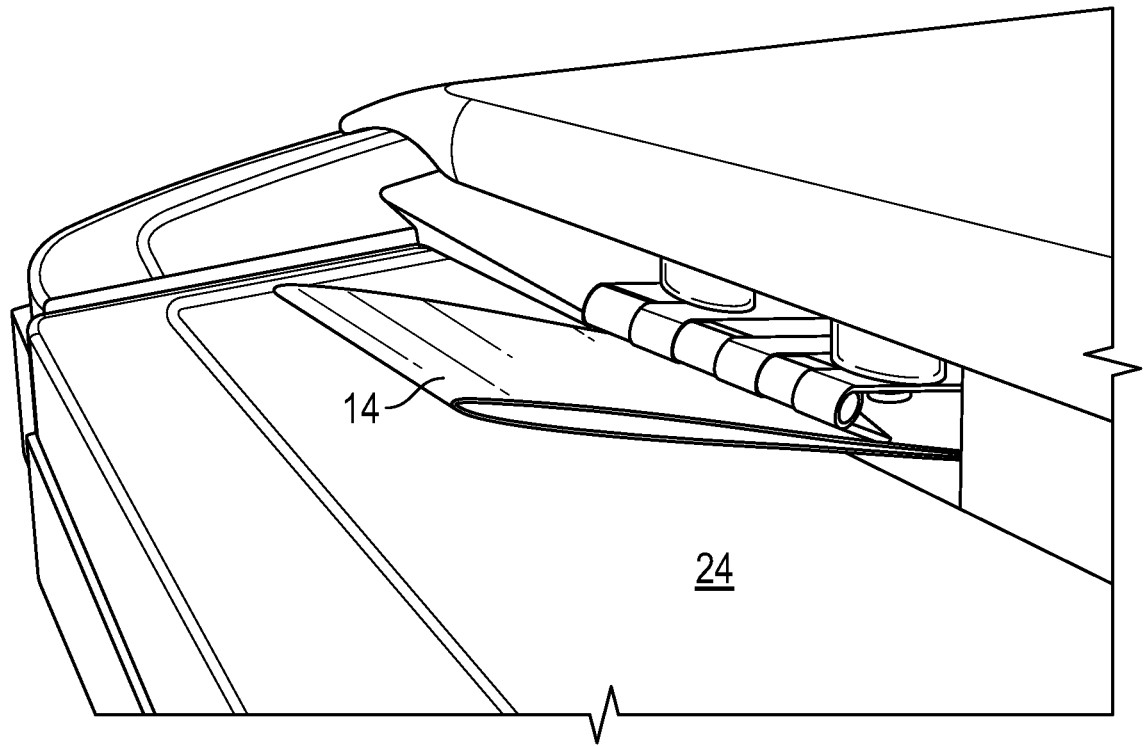
Figure 8:
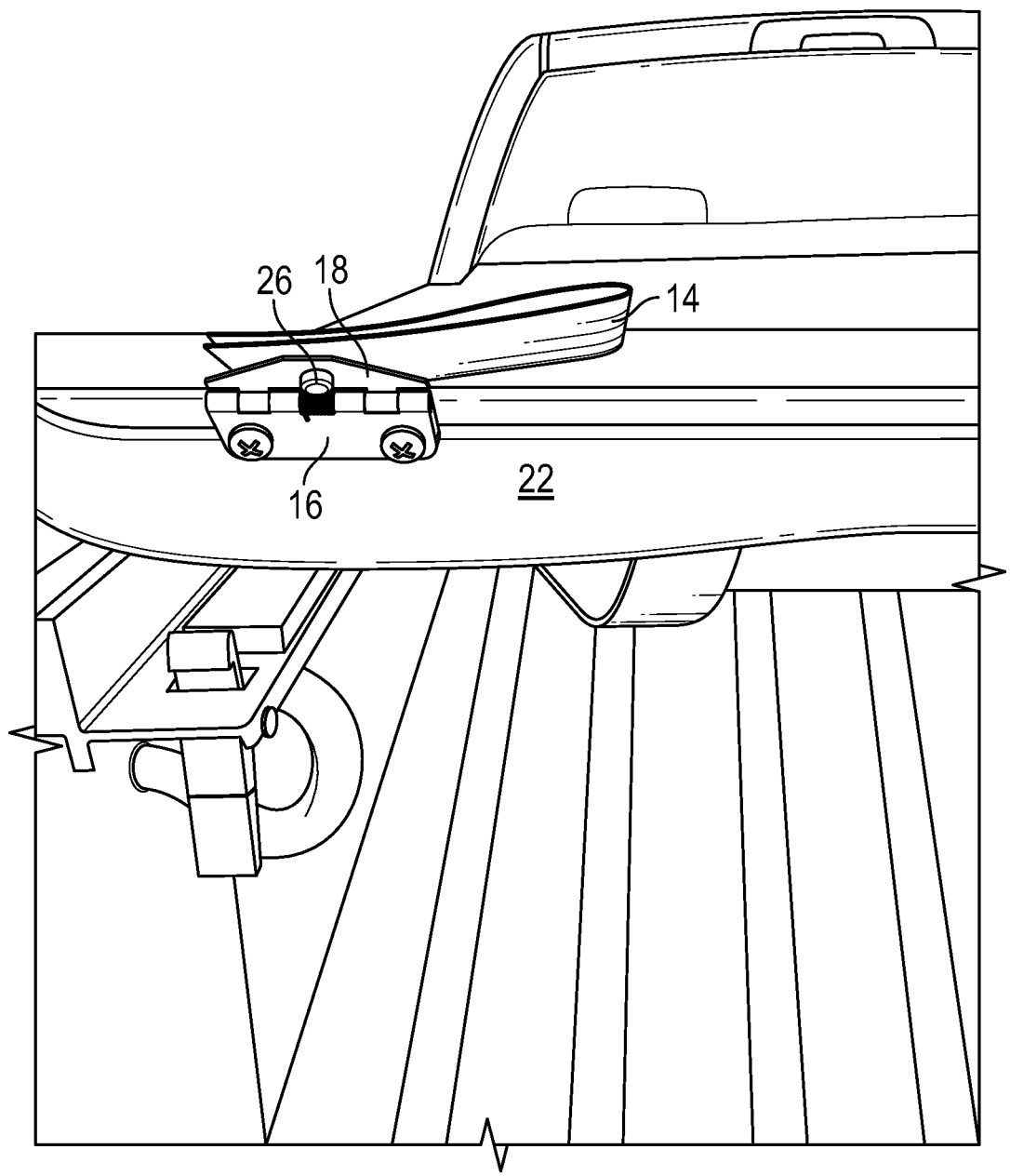
FIG. 8 shows the indicator when the bed is partially or fully rolled up so that the truck bed is open from above.

The indicator 10 is adapted to be mounted on a bed cover 22 of a pickup truck having a tailgate 24. More particularly, the first leaf 16 is attached to a lower rear edge of the bed cover 22 using any convenient means, such as small screws. As seen in FIG. 3, when the tailgate 24 is raised to its closed position covering the back end of the truck bed, the hinge 12 is folded so that the second leaf 18 lies beneath the first leaf 16, with the flag 14 extending rearwardly in a nearly horizontal orientation.

Thus, the indicator 10 automatically moves between the open position of FIG. 2 and the closed position of FIG. 3 as the tailgate moves between open and closed positions, respectively. The indicator 10 does not utilize any electrical components, such as sensors or switches, but rather provides a simple, mechanical device which can be easily seen from the cab of the truck. The indicator 10 is also free from auditory signals.

In use, the flag extends upwardly above the bed cover 22 of the truck when the tailgate 24 is open, and extends below the bed cover when the tailgate is closed. Thus, anyone in the truck cab can see when the flag 14 is raised to indicate that the tailgate 24 is open. The raised flag 14 can also be seen through the truck's rearview mirror or side mirrors. When the tailgate 24 is closed, the flag 14 will not be visible to the person in the cab, thereby indicating that the tailgate is closed, even though the tailgate itself is not visible from the truck cab due to the bed cover 24 being closed.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A tailgate position indicator for a pickup truck having a tailgate and a bed cover, comprising:
   a hinge having a first and second leaves, the first leaf being mounted to the bed cover so as to extend horizontally when the bed cover is closed and the second leaf being moveable between an open position extending downwardly from the first leaf when the tailgate is open and a closed positions extending substantially parallel to the first leaf when the tailgate is closed;
   a spring on the hinge to bias the second leaf to the open position; and
   a flag mounted on the second leaf so as to extend upwardly beyond the bed cover when the second leaf is in the open position to provide a visual indication that the tailgate is open;
   whereby the second leaf is moved to the closed position by the tailgate when the tailgate is closed such that the flag is lowered below the bed cover to provide a visual indication that the tailgate is closed.

2. The tailgate position indicator of claim 1 wherein the hinge has a hinge pivot axis, and the flag extends from the second leaf and beyond the pivot axis.

3. The tailgate position indicator of claim 1 wherein the leaves extend approximately 90° from one another when the second leaf is in the open position.

4. The tailgate position indicator of claim 3 wherein the first leaf overlies the second leaf when the second leaf is in the closed position.

5. The tailgate position indicator of claim 1 wherein the flag moves upwardly when the tailgate is opened and moves downwardly when the tailgate closed.

6. The tailgate position indicator of claim 1 wherein the hinge is free from electrical components.

7. The tailgate position indicator of claim 1 wherein the hinge operates mechanically.

8. The tailgate position indicator of claim 1 wherein the first leaf mounts to a lower surface of the bed cover.

9. The tailgate position indicator of claim 1 wherein the visual indication is located at a rear portion of the truck.

10. A method of indicating open and closed positions of a pickup truck tailgate, comprising:
    extending a flag upwardly above a closed bed cover of the truck when the tailgate is open so that a person in a cab of the truck can see the flag;
    extending the flag below the closed bed cover when the tailgate is closed so that the person in the cab cannot see the flag.

11. The method of claim 10 further comprising biasing the flag to automatically move upwardly when the tailgate is opened.

12. The method of claim 11 further comprising mechanically moving the flag downwardly with the tailgate when the tailgate is closed.

13. The method of claim 10 wherein the flag provides a visual indication of the tailgate position.

14. The method of claim 13 wherein the visual indication is free of electronics.

15. The method of claim 13 wherein the visual indication is free of auditory signals.

16. The method of claim 13 wherein the visual indication is free from sensors and switches.

17. A tailgate position indicator to allow a person in a cab of a pickup truck to observe open and closed positions of a tailgate of the truck, the truck having a bed cover, and the tailgate pivoting about a first horizontal axis between the open and closed positions, the indicator comprising:
    a spring biased flag mounted to the bed cover for movement about a second horizontal axis between a raised position above the bed cover and visible from the cab to indicate that the tailgate is open, and a lowered position below the bed cover and substantially out of view from the cab to indicate that the tailgate is closed; and
    the first and second horizontal axes being substantially parallel to one another.

18. The tailgate position indicator of claim 17 wherein the flag is moved to the lowered position by the tailgate when the tailgate is closed.

19. The tailgate position indicator of claim 17 wherein the flag resides substantially horizontally over the tailgate when the tailgate is closed.

20. The tailgate position indicator of claim 17 wherein the flag automatically moves to the raised position when the tailgate is opened.

* * * * *